United States Patent [19]

Iwata et al.

[11] 4,293,743

[45] Oct. 6, 1981

[54] COMBINATION SWITCHING MEANS OF LEVER TYPE FOR MOTOR VEHICLES

[75] Inventors: Masayosi Iwata, Hashima; Harumi Douke, Komaki, both of Japan

[73] Assignee: Kabushiki Kaisha Tokai Rika Denki Seisakusho, Aichi, Japan

[21] Appl. No.: 82,404

[22] Filed: Oct. 5, 1979

[30] Foreign Application Priority Data

Oct. 6, 1978 [JP] Japan ................................ 53-138472

[51] Int. Cl.³ .......................... H01H 3/16; H01H 9/00
[52] U.S. Cl. .................................... 200/4; 200/61.27; 200/61.54
[58] Field of Search ...................... 200/4, 61.27, 61.54

[56] References Cited

U.S. PATENT DOCUMENTS

| 3,858,176 | 12/1974 | Miller et al. | 200/61.54 |
| 4,149,048 | 4/1979 | Winter et al. | 200/4 |
| 4,204,099 | 5/1980 | Cryer | 200/4 |
| 4,206,325 | 6/1980 | Wilkinson | 200/4 |

Primary Examiner—James R. Scott
Attorney, Agent, or Firm—Wenderoth, Lind & Ponack

[57] ABSTRACT

A combination switching means of the lever type includes a lever having a double-shaft construction so as to permit an operational shaft to be extended through the inside thereof. A first switching means is actuated through a first tilting pivotal operation of the lever, and a second switching means is actuated through a second tilting pivotal operation of the lever in a direction perpendicular to the first pivotal direction. A third switching means is actuated through a twisting pivotal actuation of the operating shaft. A first constructional arrangement prevents an undesirable transmission of a specific displacement inherent in the first pivotal operation to the other switching means, a second constructional arrangement prevents an undesirable transmission of a specific displacement inherent in the second pivotal operation to the third switching means.

9 Claims, 5 Drawing Figures

COMBINATION SWITCHING MEANS OF LEVER TYPE FOR MOTOR VEHICLES

BACKGROUND OF THE INVENTION

This invention relates to a switching means for use in motor vehicles and more particularly, to a combination switching means of the lever type having a lever construction of a double shaft, which is capable of actuating three kinds of switching circuit means, i.e., a change-over switching means for direction turn signal blinking or flashing lights, a change-over switching means for selectively converting a beam level of a head-light from an approximately horizontal level to a lower level, and a switching means for actuating the head lamp and other small lamps such as tail lamps and the like.

Up to the present, there have been proposed a number of types of combination switching means of the above-described type, any one of which conventionally enables a driver of the motor vehicle to operate not only the change-over switching means for direction turn signal blinking lights, but also the change-over switching means for selectively converting the beam-level mentioned above (or a switching means to be used to effect a passing-dimmer) through respective pivotal handling operations of the lever, with the lever being, however, somewhat tilted with respect to any one of the predetermined pivotal directions. Such being the case, a knob for enabling the driver to actuate the switching means for the head lamps and the other small lamps such as tail lamps, instrument illuminating lamps is further conventionally mounted on the operating lever. However, as far as the conventional combination switching means of the above-described type is concerned, according to one typical combination, switching means in which the switching means for actuating head lamp and the like (the lighting switching means) is arranged to be accommodated within the knob mounted on the operating lever formed in a single shaft construction, the knob arrangement inevitably becomes rather bulky in size. Futhermore, a resulting from such an arrangement is that the electrically circuitry relating to the lighting switching means has to be laid through the inside of the operational lever. On the other hand, according to another typical conventional combination switching means wherein a bulky knob construction is excluded by providing an operating shaft extended through the inside of the operating lever, the operating lever and the operating shaft thus forming a double shaft construction, and the lighting switching means is arranged to be operable through a twisting pivotal actuation of a knob-portion provided at a top end of the operating lever, although the above-mentioned defects inherent in the first conventional combination switching means mentioned above are substantially excluded, the construction of the operating lever inevitably becomes in turn rather complicated due to the fact that a pivotal displacement to be effected in relation with the tilting pivotal operation of the lever has to be completely prevented from being transmitted to the lighting switching means. The situation is the same ven for a case where the above-mentioned pivotal displacement or frictional drive has to be further completely prevented from being transmitted to the passing dimmer switching means.

SUMMARY OF THE INVENTION

Accordingly, an essential object of the present invention is to provide a combination switching means of the lever type for motor vehicles having an operating lever of the double skaft construction type for permitting an operating shaft to be extended through the inside thereof, wherein a first switching means is actuated by a first tilting pivotal operation of the lever and furthermore a second switching means is actuated by a second pivotal operation of the lever in a direction perpendicular to the first tilting pivotal direction, while a third switching means is capable of being actuated through a twisting pivotal actuation of the operating shaft.

Another important object of the present invention is to provide a combination switching means of the above-described type, wherein an undesirable transmission of specific displacement or frictional drive inherent in the first tilting pivotal operation to the second and third switching means as well as that inherent in the second tilting pivotal operation to the third switching means are prevented by quite a simple configurational arrangement.

A further object of the present invention is to provide a combination switching means of the above-described type, which is easily handled and highly efficient in use.

A still further object of the present invention is to provide a combination switching means of the above-described type, which is simple in structure and thereby, readily applied to all types of motor vehicles.

A further object of the present invention is to provide a combination switching means of the above-described type, which can be manufactured at low cost.

In accomplishing these and other objects according to one preferred embodiment of the present invention, there is provided a combination switching means of the lever type for motor vehicles having an operating lever of double lever construction.

The above-mentioned combination switching means of the present invention comprises:

a framework provided with a through hole in preparation for accommodating a jacket-pipe for steering shaft therethrough, which is securely mounted on an inner portion of a car body located in front of a driving seat;

a lever support member which is mounted on a shaft integrally projected from the framework so as to actuate a change-over switching means for turning direction winking lights with the help of a first operating member integrally provided for the lever support member when pivotally moved;

a hollow operating member which is connected to the lever support member by means of supporting shaft members so as to pivotally move with the lever support member when a first tilting pivotal movement for actuating the change-over switching means for turning direction winking lights (a first switching means) is conducted by the hollow operating member, with the hollow operating lever being further arranged to effect a second tilting pivotal movement approximately perpendicular to the direction of the first tilting pivotal movement with respect to said supporting shaft members;

a second operating member provided for the hollow operating lever in a manner such that only a frictional drive or displacement to be effected in association with the second tilting pivotal movement is specifically transmitted to a first sliding member;

a change-over switching means for selectively converting a beam-level of a head light and effecting a passing-dimmer (a second switching means) which is actuated through a sliding movement of the first sliding member;

an operating shaft, which is extended through an inside of the hollow operating lever while being in a state capable of being pivotable by means of its twisting pivotal actuation, and further is provided with a third operating member; and a second sliding member which is driven only through a twisting pivotal displacement caused by the third operating member, so that a switching means for actuating head lamps and the other small lamps such as tail lamps and the like (a third switching means) is actuated.

More specifically, according to the present invention, to prevent an undesirable transmission of specific displacement or frictional drive inherent in the first tilting pivotal movement to the second switching means, a portion of the first sliding member, with which a portion of the second operating member is engaged, is formed to have an approximately circular groove which is defined with respect to the shaft integrally projected from the framework as described above. Similarly, to prevent an undesirable transmission as described above to the third switching means, a portion of the second sliding member, with which a portion of the third operating member is engaged, is formed in an approximately U-shaped groove. And, furthermore, an engagement between the second sliding member and the third operating member is arranged to be effected in the vicinity of a center of the shaft mentioned above. On the other hand, to prevent an undesirable transmission of specific displacement or frictional drive inherent in the second tilting pivotal operation to the third switching means, an inner configuration of the approximately U-shaped groove formed on the second sliding member is so arranged in shape that every displacement to be effected by the third operating member according to the second tilting pivotal operation is simply effected within a space which constitutes the above-mentioned U-shaped groove without causing any effects concerning the frictional drive for the actuation of the third switching means.

BRIEF DESCRIPTION OF THE DRAWINGS

These and other objects and features of the present invention will become apparent from the following description taken in conjunction with a preferred embodiment thereof with reference to the accompanying drawings in which.

Before the description of the present invention proceeds, it is to be noted that like parts are designated by like reference numerals throughout the several views of the accompanying drawings.

DETAILED DESCRIPTION OF THE INVENTION

Figure 1:
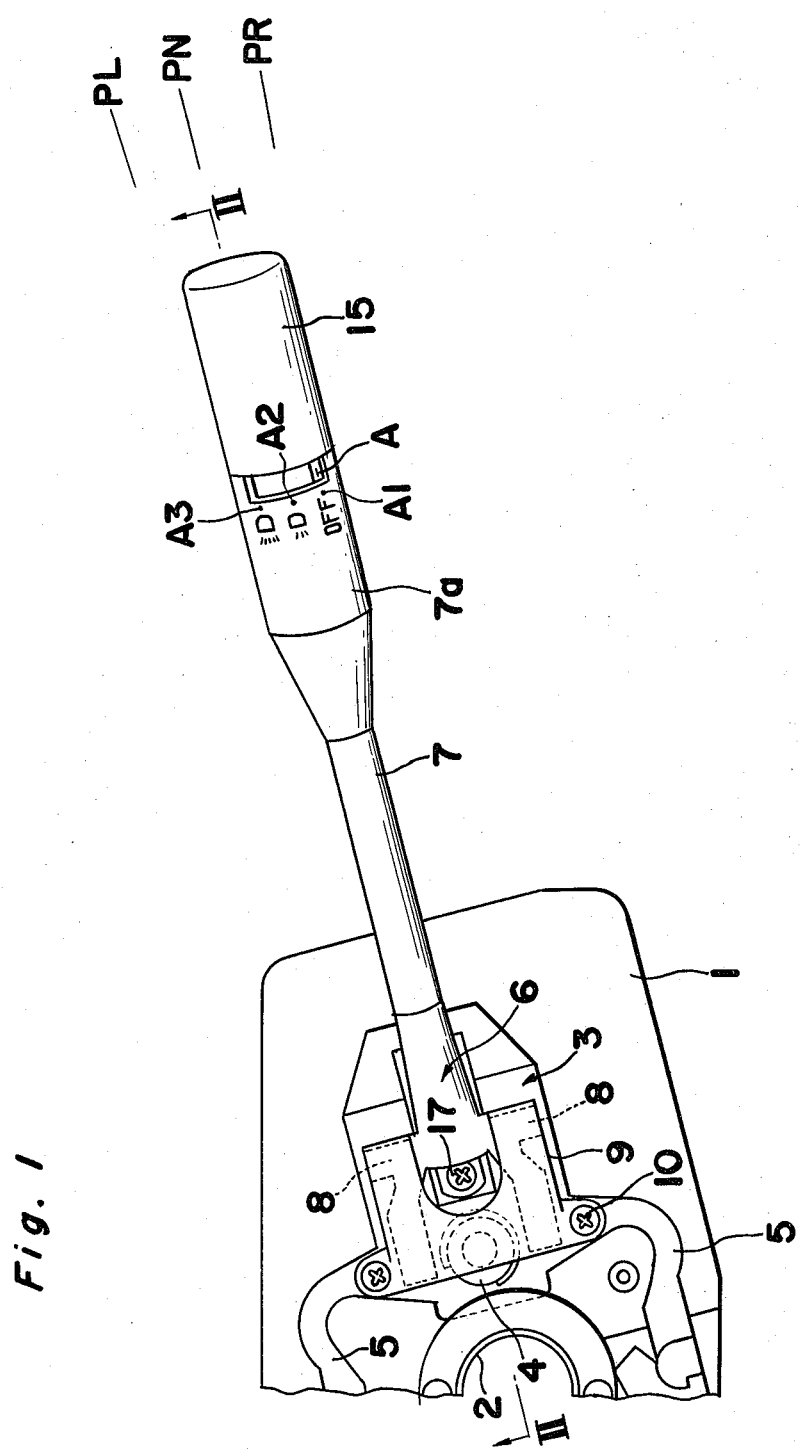
FIG. 1 is a partial, front view showing a combination switching means of the lever type for motor vehicles according to the present invention.
Figure 2:
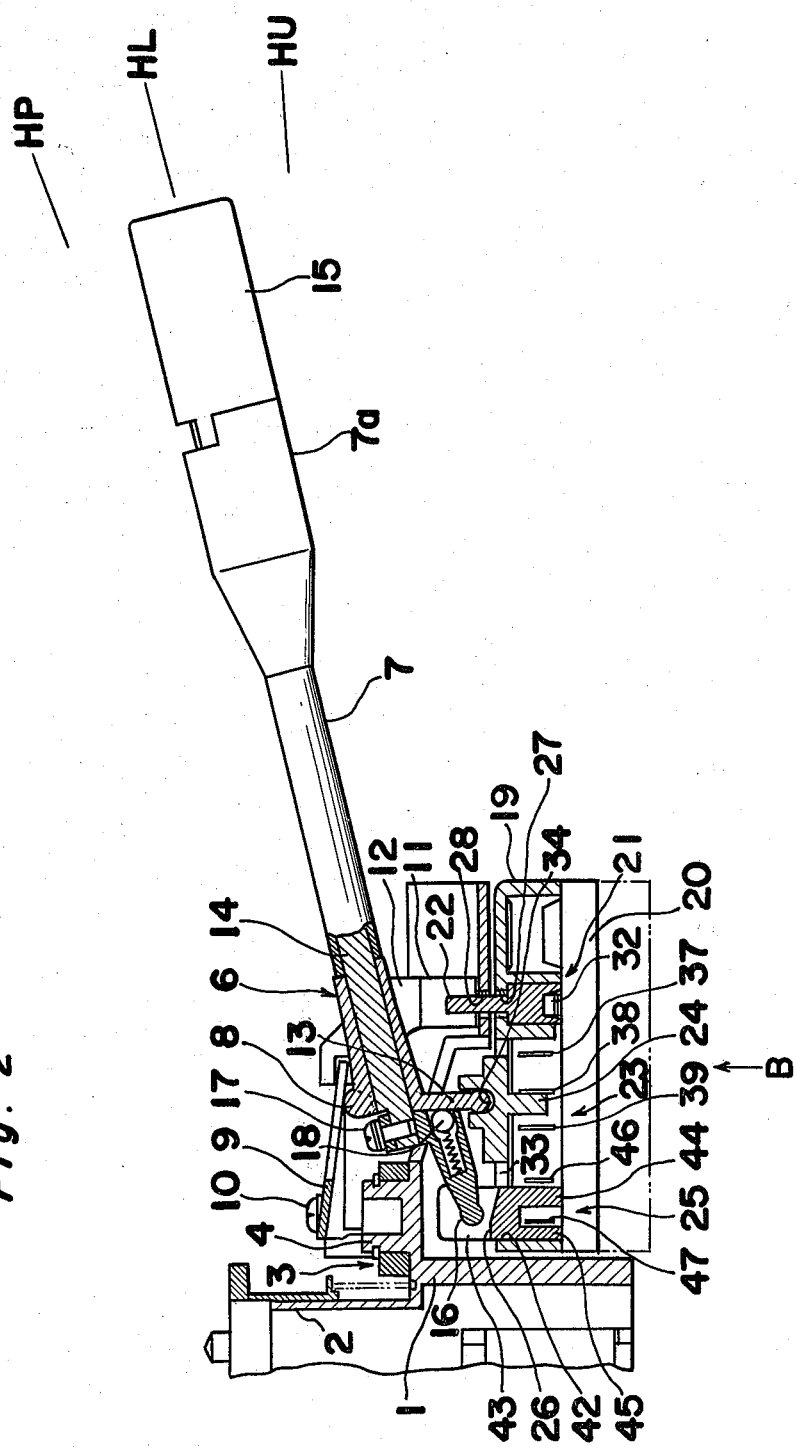
FIG. 2 is a sectional view taken along the line II—II of FIG. 1.

Referring now to FIGS. 1 and 2, there is shown one preferred embodiment of a combination switching means of the lever type for motor vehicles according to the present invention. As is clear from FIG. 1, the combination switching means of the lever type superficially includes a framework 1 provided with a through hole 2 for accommodating a jacket-pipe of a steering shaft which is securely mounted on an inner portion of a car body located in front of a driving seat, a lever support member 3, which is pivotally mounted on a hollow shaft 4 integrally projected from the framework 1 and is provided with a pair of arms 5 to associate with a cancelling actuator of a cam mechanism of a known type (not shown), and a coupling member 6 for coupling an operating lever 7 in the form of a hollow tube to main construction of the switching means. As is clear from FIG. 1, the coupling member 6 is provided with a pair of supporting rods or supporting shaft-members 8 which are integrally formed with the coupling member 6 and which laterally extend therefrom on opposite sides of a center line of the operating lever 7 as viewed in FIG. 1. Furthermore, the supporting rods 8 are respectively incorporated into recessed portions (not shown) provided within the lever support member 3. Rods 8 are enclosed by a plate-like metallic member 9 mounted on the lever support member 3 by screws 10 so that the coupling member 6 may not become disengaged from the lever support member 3. Accordingly, by the arrangement mentioned above, when the operating lever 7 is pivotally moved either upwardly or downwardly (as viewed in FIG. 1) between its predetermined terminal locations denoted by PL and PR, with the lever 7 being, however, somewhat tilted with respect to a substantially pivotal direction, the operating lever 7 and its supporting member 3 are, as a whole, pivotally moved around the hollow shaft 4, until engaged by predetermined angular displacement retaining mechanisms (not show) at any one of three predetermined change-over locations, i.e., a left turning indicating mode of the lever PL, a neutral mode of the lever PN, and a right turning indicating mode of the lever PR. For the sake of brevity, the above-described pivotal operation of the lever 7 is referred to hereinafter as a first pivotal operation. Furthermore, when the operating lever 7 is pivotally moved either upwardly or downwardly (as viewed in FIG. 2) between its predetermined terminal locations denoted by HP and HU in FIG. 2, with the lever 7 being, however, somewhat tilted with respect to a substantially pivotal direction, the operating lever 7 located in any one of the locations of the first pivotal operation (i.e., any one of the locations denoted by PL, PN, and PR) is capable of being further pivotally moved, about the supporting rods 8, without causing any mutual interfering actuations between the first pivotal operation and the second pivotal operation. This second pivotal operation of the operating lever 7 is for the purpose of achieving change-over actuations of a passing dimmer switching means. The operating lever 7 is selectively retained by a retaining mechanism (not shown) either in the location denoted by HU whereat the headlights are at high beam or in the location denoted by HL whereat the headlights are at low beam. Furthermore, according to the present arrangement, pivotal movement of the operating lever 7 from a location HP capable of effecting a passing light-beam as will be detailed later, to the location HL is automatic, whereby an alternative positioning of the lever 7 from the location HP to the location HL can be thus repeatedly accomplished in quite a handy manner.

A first operating member 12 provided with a U-shaped groove 11 is integrally formed in the lever support member 3. On the other hand, as is clear from FIG. 2, a second operating member 13 is integral with and extends from a lower portion of the coupling member 6. An operating shaft 14 extends through the inside of the operating lever 7 in a manner such that the shaft 14 is capable of being pivoted therein by a pivotal twisting or rotating actuation. A portion of the operating shaft 14 extends outwardly through a gripping portion 7a of the operating lever 7 and is in the form of a knob 15 for actuating a lighting switching means. An opposite end of the operating shaft 14 extends outwardly through the coupling member 6 and has mounted thereon a third operating member 16 by means of a screw 17 in a manner such that the member 16 extends generally forwardly in a direction almost parallel to the center-line of the shaft 14. The third operating member 16 is, as a whole, pivotally moved, upon a twisting pivotal movement of the shaft 14 by a twisting or rotating pivotal actuation of the knob 15. More specifically, the member 16 mentioned above is thus capable of being correspondingly adjustably positioned at any one of predetermined locations thereof in association with the pivotal movement of the knob 15 and shaft 14. An indicating member A provided on the knob 15 is relatively pivotally moved upon rotation of knob 15 and is then positioned at any one of pulural light actuating indexes provided on the gripping portion 7a, for example, an electrically OFF-POSITION $A_1$ for respective switching means for the lighting-system, an electrically ON-POSITION $A_2$ for respective switching means for the small lamps, and an electrically ON-POSITION $A_3$ for a switching means for the head-lamps, respectively. The member 16, which is correspondingly adjustably positioned in a manner as mentioned above, is arranged to be appropriately retained in one of the corresponding locations thereof by means of a predetermined displacement retaining mechanism 18 provided between the third member 16 and the second member 13.

Figure 3:
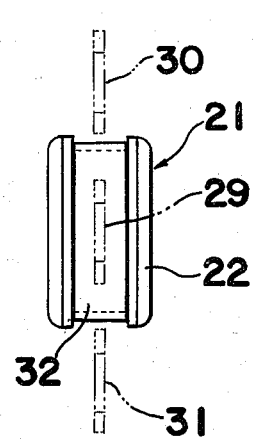
FIGS. 3 to 5 are schematic views each showing a switching mechanism as viewed in the direction of an arrow B in FIG. 2.

A retaining frame 19 is fixedly mounted on a contact-member retaining base member 20, wherein an electrical contact holder 22 for use with a change-over switching means 21 for turning direction blinking signal lights (a first switching means), a first sliding member 24 specifically related to a passing dimmer switching means 23 (a second switching means), and a second sliding member 26 specifically related to a lighting switching means 25 (a third switching means) are slidably retained by the retaining frame 19. A projected head portion of the electrical contact holder 22, which is extended through and is projected from a through hole 27 formed in a portion of the retaining frame 19 and a through hole 28 formed in a portion of the framework 1, is further engaged with U-shaped groove 11 provided in the first operating member 12 integrally formed as a portion of the lever support member 3. Accordingly, following the pivotal movement of the lever support member 3 with respect to the hollow shaft 4 in a manner as described alone, the electrical contact holder 22 is successively relatively moved in directions perpendicular to the plane of FIG. 2 owing to engagement between the projected head portion mentioned above and the U-shaped groove 11. The abovementioned movement with respect to FIG. 2 corresponds to movement in vertical directions as viewed in FIG. 3. In addition to the arrangements mentioned above, the electrical contact holder 22 is further provided on its bottom surface-portion with a movable contact 32 as is specifically shown in FIG. 2 so that an electrical connection to be effected by fixed contacts 29 and 30 as well as an electrical connection to be effected by fixed contacts 29 and 31 may be selectively made, subject to the abovementioned movement of the holder 22. The fixed contacts 29, 30 and 31 are provided on the top portion of the contact-member retaining base member 20 portion as shown in FIG. 3. Accordingly, such being the case, when the operating lever 7 is disposed in the neutral state as denoted by the position PN in FIG. 1, the electrical contact holder 22 will be in the position shown in FIG. 3. As the operating lever 7 is moved to the right turning mode as denoted by the position PR in FIG. 1, the electrical contact holder 22 is slidably moved upwards in FIG. 3 so that the right turn blinking light is in its ON-mode soon after the electrical connection to be effected by fixed contacts 29 and 30 is brought about. Similarly, as the operating lever 7 is moved to the left turning mode as denoted by the position PL in FIG. 1, the electrical contact holder 22 is slidably moved downwards in FIG. 3 so that the left turn blinking light is in its ON-mode soon after the electrical connection to be effected by the fixed contacts 29 and 31 is brought about.

Figure 4:
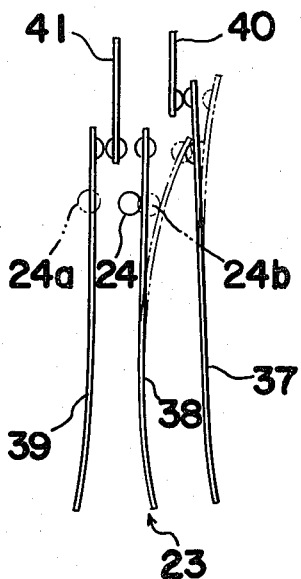
Figure 5:
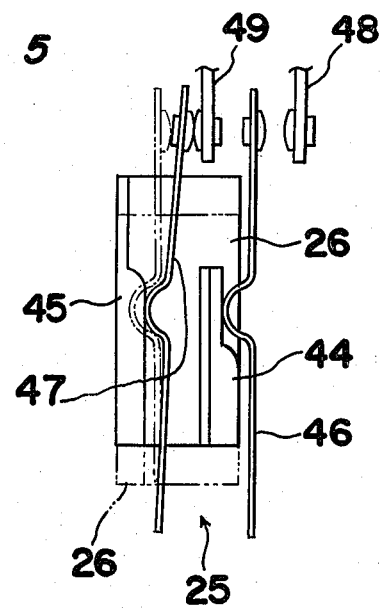

The first sliding member 24 mentioned above is arranged to be capable of being slidably moved rightwardly or leftwardly, as viewed in FIG. 2, along a hole 23 formed in the retaining frame 19. An approximately circular-shaped groove or recess 34, which is defined with respect to a center of the hollow shaft 4, is formed in the first sliding member 24, and the leading portion of the second operating member 13 is rounded and engaged with the groove 34. The first sliding member 24 operates the passing dimmer switching means 23 including respective plates for movable contacts 37, 38 and 39 and respective plates for fixed contacts 40 and 41 as is shown in FIG. 4. By the arrangement mentioned above, when the operating lever 7 is positioned in the low beam-position HL as shown in FIG. 2, the first sliding member 24 is in the solid line position shown in FIG. 4. Such being the case, the plate of movable contact 38 is spaced apart from the plate of fixed contact 41, with the plate of movable contact 39 being brought into contact with the plate of fixed contact 41, whereby the head lamps at the low beam-lever are actuated subject to the condition that the knob 15 has been already set in the electrically ON-POSITION $A_3$. On the other hand, when the operating lever 7 is positioned in the high beam position HU shown in FIG. 2, the second operating member 13 is pivotally moved clockwise with respect to the supporting rods 8 in FIG. 2. Such being the case, the first sliding member 24 is slidably moved toward the left as shown in FIG. 2, and to the position 24a shown by the dashed line in FIG. 4. Therefore, as is clear from FIG. 4, the first sliding member 24 thus moved towards the left pushes the plate of movable contact 39 towards the left so as to cause the plate of movable contact 39 to be spaced apart from the plate of fixed contact 41, with the plate of movable contact 38 being brought into contact with the plate of fixed contact 41, whereby the head lamps are actuated to the high beam-lever, which is connected to the plate of movable contact 38. More specifically, such being the case, so far as an electric circuit is concerned, the plate of movable contact 37 is connected to an electrical power supply source (not shown) and the plate of fixed contact 41 is connected with the electrical power supply source mentioned above through a combination of the plate of movable contact 37 and the plate of fixed contact 40, and the lighting switching means 25. If the operating lever 7 is pivoted from the low beam position to the passing beam position, denoted by HL and HP, respectively, in FIG. 2, the first sliding member 24 is forcibly moved from the position 24 shown by the solid line and a position 24b denoted by a dashed line in FIG. 4. Such being the case, the first sliding member 24 moves the plate of movable contact 38 into contact with a lower contact of the plate of movable contact 37, while an upper contact of the plate of movable contact 37 is moved away from the plate of fixed contact 40, whereby the the high beam-level of the head lamps is actuated to effect the passing-display. Such operation is intermittent when lever 7 is repeatedly pivoted to position HP. The second sliding member 26 mentioned earlier is arranged to be capable of being slidably moved along a hole 42 formed in the retaining frame 19 in relative directions perpendicular to the plane of FIG. 2. A U-shaped groove 43 is formed in an upper portion of the member 26 in FIG. 2, and two driving members 44 and 45 (FIG. 5) are integrally provided at a bottom surface-portion of second sliding member 26. The driving members 44 and 45 are employed for actuating the lighting switching means 25 including the plate of movable contact 46, the plate of movable contact 47, the plate of fixed contact 48 and the plate of fixed contact 49. The plate of fixed contact 49 is connected to the electrical power supply source, with the plate of movable contact 47 being directly connected to the small lamps of the vehicle, whereas a switching element constituted by a combination of the plate of movable contact 46 and the plate of fixed contact 48 is electrically connected to the plate of fixed contact 40 and the plate of fixed contact 41 at its opposite ends. By this arrangement, in association with the pivotal movement of the shaft 14 by a twisting pivotal actuation of the knob 15, the third member 16 mounted on the operating shaft 14 in a manner as previously described is pivotally moved accordingly. Upon the pivotal movement mentioned above, since the third operating member 16 is engaged by the U-shaped groove 43 formed in the second sliding member 26, the second sliding member 26 is slidably moved in a movement correspondingly related to the pivotal direction of the knob 15. More specifically, as a result of the pivotal movement of the knob 15, the second sliding member 26 is slidably moved in a vertical direction as shown in FIG. 5. If the knob 15 is set in the electrically OFF-POSITION $A_1$, the second sliding member 26 takes the position shown by the dashed lines in FIG. 5, whereby both driving members 44 an 45 cause respectively the plate of movable contact 46 and the plate of movable contact 47 to be spaced apart from respectively the plate of fixed contact 48 and the plate of fixed contact 49. On the other hand, starting from the situation just mentioned above, when the knob 15 is successively pivotally moved so as to be set in the electrically ON-POSITION $A_2$ for switching to actuate the small lamps, the second sliding member 26 is driven to a position shown by the solid lines in FIG. 5, with the plate of movable contact 47 being in contact with the plate of fixed contact 49 through a frictional drive caused by the member 45, whereby the small lamps are moved into their respective ON-modes. Furthermore, as the knob 15 is pivotally moved so as to be set in the electrically ON-POSITION $A_3$ for switching to actuate the head-lights, the second sliding member 26 is driven to a further upper position with respect to the position shown by the solid lines in FIG. 5, the plate of movable contact 46 is moved into contact with the plate of fixed contact 48, with the plate of movable contact 47 still being in contact with the plate of fixed contact 49, whereby the small lamps and the head-lamps are both moved into their respective ON-modes.

According to the present invention, in the arrangements described in the foregoing, there is no danger at all that a frictional drive or an operational displacement concerning the first switching operation may be unexpectedly transmitted to the passing dimmer switching means 23 through the second member 13 during the pivotal movement of the operating lever 7, with the lever 7 being somewhat tilted with respect to the pivotal direction, since the groove 34 of the first sliding member 24, which is engaged by the second member 13, is circular in shape as previously described. Furthermore, the operational displacement to be effected as described above will not be transmitted to the second sliding member 26 constituting the lighting switching means 25 through the second sliding member 26 owing to the fact that the location of engagement to be effected between the third operating member 16 and the U-shaped groove 43 formed in the second sliding member 26 is arranged to be positioned in the vicinity of the approximate center of the hollow shaft 4. Moreover, any operational displacement of the third operating member 16 to be effected in association with the second switching operation will not be transmitted to the second sliding member 26, since any such displacement of the third operating member 16 or more specifically of the head portion of the third member 16 is simply effected vertically as viewed in FIG. 2, in the space formed by the U-shaped groove 43 formed in the second sliding member 26. Such being the case, the second sliding member 26 is not affected by the above-mentioned displacement of the third operating member 16, whereby the passing dimmer switching means 23 can be independently actuated accordingly.

Thus, the arrangement, in which not only the displacement or the frictional drive to be accompanied by the operation in association with the change-over actuation of the passing dimmer switching means 23 is not transmitted to the lighting switching means 25, but also the displacement or the frictional drive to be accompanied by the operation in association with the change-over actuation of the change-over switching means 21 is transmitted neither to the passing dimmer switching means 23 nor to the lighting switching means 25, can only be effectively brought about by employing the first and second members 24 and 26 of the above-described sliding type. More specifically, the functional characteristics of the present invention are effectively brought about by employing the sliding members 24 and 26 so as to perform the respective change-over actuations of the passing dimmer switching means 23 and the lighting switching means 25, wherein no cam mechanisms are employed for operating the respective functions of the switching means 23 and 25. Furthermore, according to the present arrangement, in order to exclude all mutual interfering actuations which might be brought about when employing several kinds of change-over operations in switching means of the combination type, there is provided the arrangement, wherein the sliding members 24 and 26 substantially functioning for the above-mentioned purpose are formed in simple configurations each having a groove, i.e., the engageable groove 34 or the U-shaped groove 43, which is each arranged to be engageable with the other member only for one direction. On the other hand, as far as the turning direction indicating switching means is concerned, the turning direction indicating switching means is not limited to the sliding actuating type, which is, however, disclosed hereinabove as one of the preferred embodiments of the present invention.

As is clear from the above description, in the combination switching means of the lever type for a motor vehicle having a lever of double shaft construction for permitting the operating shaft to be extended through the inside of the lever, wherein the first switching means is actuated by a first pivotal operation of the lever and furthermore the second switching means is actuated by a second pivotal operation of the lever in a direction perpendicular to the first tilting pivotal direction, while the third switching means is capable of being actuated through a twisting pivotal actuation of the operating shaft, there is further provided the first constructional arrangement capable of preventing the undesirable transmission of the specific displacement inherent in the first pivotal operation to the second and third switching means as well as the second constructional arrangement capable of preventing the undesirable transmission of the specific displacement inherent in the second pivotal operation to the third switching means, both of which are quite simple in construction according to the present invention.

Although the present invention has been fully described by way of example with reference to the accompanying drawings, it is to be noted here that various changes and modifications are apparent to those skilled in the art. Therefore, unless otherwise such changes and modifications depart from the scope of the present invention, they should be construed as included therein.

What is claimed is:

1. A combination switching assembly of the lever type for use in a motor vehicle, said assembly comprising:
   a support frame adapted to be mounted on a steering column of a motor vehicle, said support frame having projecting therefrom a pivot shaft;
   a lever support member mounted to pivot about said pivot shaft;
   a hollow operating lever;
   supporting shaft member means for connecting said operating lever to said lever support member such that upon application to said operating lever of a first tilting pivotal movement in a first direction said operating lever and said lever support member together pivot about said pivot shaft, and such that upon application to said operating lever of a second tilting pivotal movement in a second direction substantially perpendicular to said first direction said operating lever pivots with respect to said lever support member about an axis of said supporting shaft member means;
   first, second and third switching means, fixed with respect to said support frame, for achieving first, second and third switching operations, respectively;
   first operating member means, connected to said lever support member, for, upon movement of said operating lever and said lever support member about said pivot shaft in said first direction, actuating said first switching means;
   first sliding member means, mounted for sliding movement with respect to said support frame, for actuating said second switching means;
   second operating member means, connected to said operating lever, for, upon movement of said operating lever in said second direction, causing said first sliding member means to actuate said second switching means, and for, upon movement of said operating lever in said first direction, preventing sliding movement of said first sliding member means and thus preventing actuation of said second switching means;
   an operating shaft extending coaxially through the interior of said operating lever and being mounted therein for twisting rotational movement with respect thereto;
   second sliding member means, mounted for sliding movement with respect to said support frame, for actuating said third switching means; and
   third operating member means, connected to said operating shaft for, upon twisting rotational movement of said operating shaft with respect to said operating lever, causing said second sliding member means to actuate said third switching means, and for, upon movement of said operating lever in said first or second directions, preventing sliding movement of said second sliding member means and thus preventing actuation of said third switching means.

2. An assembly as claimed in claim 1, further comprising contact holder means mounted for sliding movement with respect to said support frame and adapted to be moved by said first operating member means, for actuating said first switching means.

3. An assembly as claimed in claim 2, wherein said first operating member means includes a substantially U-shaped groove, and said contact holder means includes a portion received within said U-shaped groove.

4. An assembly as claimed in claim 1, wherein said first sliding member means slides in a direction substantially perpendicular to the direction of sliding movement of said second sliding member means.

5. An assembly as claimed in claim 1, wherein said first sliding member means has therein a substantially circular recess, and said second operating member means has a rounded portion engaging said circular recess.

6. An assembly as claimed in claim 1 or in claim 5, wherein said second sliding member means includes a substantially U-shaped groove, said third operating member means includes a portion received within said U-shaped groove, and the size of said U-shaped groove is such that upon said operating lever moving in said second direction said portion of said third operating member means moves fully within said U-shaped groove without imparting sliding movement to said second sliding member means.

7. An assembly as claimed in claim 6, wherein engagement between said portion of said third operating member means and said second sliding member means within said U-shaped groove occurs at a position substantially axially aligned with the axis of said pivot shaft, such that movement of said operating lever in said first direction will not cause said second sliding member means to slide.

8. An assembly as claimed in claim 1, wherein said third operating member means engages said second sliding member means at a position substantially axially aligned with the axis of said pivot shaft, such that movement of said operating lever in said first direction will not cause said second sliding member means to slide.

9. An assembly as claimed in claim 1, wherein said first switching means comprises means for operating direction turn signal blinking lights, said second switching means comprises means for changing the beam level of head lamps, and said third switching means comprises means for selectively operating said head lamps and other lamps of the vehicle.

* * * * *